United States Patent
Hasegawa et al.

(10) Patent No.: US 9,596,900 B2
(45) Date of Patent: Mar. 21, 2017

(54) UPPER DIE FOR FASTENING BUTTON

(75) Inventors: Kenji Hasegawa, Tokyo (JP); Hiroyuki Sugiyama, Tokyo (JP)

(73) Assignee: YKK Corporation (JP)

( * ) Notice: Subject to any disclaimer, the term of this patent is extended or adjusted under 35 U.S.C. 154(b) by 1228 days.

(21) Appl. No.: 13/518,241

(22) PCT Filed: Dec. 25, 2009

(86) PCT No.: PCT/JP2009/071680
§ 371 (c)(1),
(2), (4) Date: Aug. 10, 2012

(87) PCT Pub. No.: WO2011/077571
PCT Pub. Date: Jun. 30, 2011

(65) Prior Publication Data
US 2012/0298308 A1    Nov. 29, 2012

(51) Int. Cl.
*A41H 37/00* (2006.01)
*B21J 15/02* (2006.01)
(Continued)

(52) U.S. Cl.
CPC .............. *A41H 37/00* (2013.01); *B21J 15/02* (2013.01); *B21J 15/025* (2013.01); *B29C 65/606* (2013.01); *B29C 65/64* (2013.01); *B29C 66/304* (2013.01); *B29C 66/474* (2013.01); *B29C 66/742* (2013.01); *B29C 66/81431* (2013.01); *B29C 66/81611* (2013.01);
(Continued)

(58) Field of Classification Search
CPC ...... A41H 37/00; A41H 37/10; A41H 37/001; A41H 37/02; A41H 37/04; B29C 65/60; B29C 65/56

USPC ........ 173/162.1, 162.2; 227/18, 30, 15, 149, 227/62, 10; 83/138–140; 2/265; 29/505
See application file for complete search history.

(56) References Cited

U.S. PATENT DOCUMENTS 4,962,875 A * 10/1990 Sodeno .................. A41H 37/00
227/149
6,012,215 A * 1/2000 DeMoura ........................ 29/505
(Continued)

FOREIGN PATENT DOCUMENTS

EP    2133178 A1 * 12/2009 ............... B25C 1/06
JP    S54-91223    1/1981
(Continued)

OTHER PUBLICATIONS

International Search Report and Written Opinion, PCT International Application No. PCT/JP2009/071680, mailed Apr. 6, 2010.

*Primary Examiner* — Andrew M Tecco
*Assistant Examiner* — Chelsea Stinson
(74) *Attorney, Agent, or Firm* — Kilpatrick Townsend & Stockton LLP

(57) ABSTRACT

A button-fastening upper die includes a die body, a button-holding member and a cylindrical elastic member arranged between the die body and the button-holding member. By providing the elastic member with an annular recess recessed radially outward from the inner surface e.g. at the middle of the surface, the elastic member is sectioned into a thin-walled section located radially outward from the recess and two or more thick-walled sections remaining above and below the recess and the thin-walled section.

4 Claims, 10 Drawing Sheets

(51) Int. Cl.
*B29C 65/60* (2006.01)
*B29C 65/64* (2006.01)
*B29C 65/00* (2006.01)
*B29L 19/00* (2006.01)

(52) U.S. Cl.
CPC .... *B29C 66/83221* (2013.01); *B29C 66/9231* (2013.01); *B29C 66/9292* (2013.01); *B29C 66/729* (2013.01); *B29C 66/7294* (2013.01); *B29C 66/81423* (2013.01); *B29C 2793/0045* (2013.01); *B29L 2019/00* (2013.01); *Y10T 156/1309* (2015.01)

(56) References Cited

U.S. PATENT DOCUMENTS

| | | | |
|---|---|---|---|
| 7,219,433 B2* | 5/2007 | Gorenflo | B27B 17/0033 173/162.2 |
| 8,104,547 B2* | 1/2012 | Kunz | B25C 1/06 173/162.1 |
| 2002/0157230 A1* | 10/2002 | Okada | A41H 37/10 29/407.08 |
| 2013/0125663 A1* | 5/2013 | Hasegawa | D06H 1/00 73/839 |
| 2015/0052666 A1* | 2/2015 | Kanazawa | A41H 37/04 2/265 |

FOREIGN PATENT DOCUMENTS

| | | |
|---|---|---|
| JP | 1-164727 | 11/1989 |
| JP | H04-58835 | 3/1994 |
| JP | 3010311 U | 5/1995 |
| JP | 11-1812 A | 1/1999 |
| JP | 3148123 U | 1/2009 |

* cited by examiner

UPPER DIE FOR FASTENING BUTTON

This application is a national stage application of PCT/JP2009/071680 which is incorporated herein by reference.

BACKGROUND OF THE INVENTION

The present invention relates to an upper die for fastening a button, and more specifically, to an upper die for use in fastening a button such as a snap button and a decorative button, to a cloth using a button fastener.

When a button such as a male snap button, a female snap button, a decorative button is fastened to a cloth by swaging a post of a button fastener, an upper die is generally used. Such an upper die, as disclosed in e.g. JP,H11-1812,A, is connected to an up-and-down part of a button-fastening press machine. The upper die comprises a die body (swaging punch) having a columnar punch to swage the post of a button fastener, a button-holding member (guide punch) to hold a button at the time of fastening the button, the button-holding member having a center bore to pass the punch therethrough, a cylindrical elastic member disposed between the die body and the button-holding member. When a button is fastened to a fabric, the button is held by the button-holding member of the upper die, a button fastener is set on a lower die, and a cloth is placed horizontally between the button and the button-fastener. After that, the upper die is lowered by operating the button-fastening press machine. By the lowering of the upper die, the post of the button fastener pierces the cloth upward and then passes through a button-fastening opening of the button, and subsequently the post is swaged by the punch of the punch body. At the time of the swaging, the button-holding member pushes the button against the cloth, and the cloth is compressed between the button and the lower die. The elastic member is deformed at the time of the post piercing the cloth by receiving a load in the axial direction from the punch body and the button-holding member, and is also deformed, more than at the cloth-piercing time, at the time of the post being swaged while the cloth is being pressed down. Thereby, the elastic member can help absorb and relieve a load as imposed on the button, the upper die, the button-fastening press machine, etc. at both of the cloth-piercing time and the post-swaging time.

However, the elastic member in a conventional upper die has a single flexibility (spring property) where an amount of deformation increases approximately in proportion to the load in the radial direction. Therefore, to deal with both of the loads at cloth-piercing time and at the post-swaging time, the elastic member can be deformed more than necessary at the swaging by accepting an excess of load, which imposes a high load on the button, the upper die, the button-fastening press machine, etc. If the flexibility of the elastic member is changed in order to reduce the load imposed on the upper die etc. at the swaging, a defect such as buckling of the post would occur at the cloth-piercing time, preventing the post from passing through the cloth smoothly.

[Patent document 1] JP,H11-1812,A

An object of the invention as made in view of such problems as mentioned above is to provide an upper die for fastening a button, which can deal with both of loads as being imposed on an elastic member at cloth-piercing time and at the post-swaging time and can reduce a load as imposed on a button, an upper die, a button-fastening press machine, etc. at the post-swaging time.

SUMMARY OF THE INVENTION

To solve the problems, according to the present invention, there is provided a button-fastening upper die for swaging a post of a button fastener, at the time of fastening a button having a fastening opening to a cloth (the cloth covers fabric, felt, nonwoven fabric, leather, resin sheet, etc.) using the button fastener, after the post has passed through the cloth and then the fastening opening, the button-fastening upper die comprising: a cylindrical elastic member; a die body including an upper elastic member receiving part to receive an axially upper surface of the elastic member, and a columnar punch to swage the post of the button fastener; and a button-holding member by which the button is held at the time of fastening the button to the cloth, the button-holding member including a lower elastic member receiving part to receive an axially lower surface of the elastic member and a center bore through which the punch passes; wherein the elastic member includes at least one annular recess which is recessed radially outward from the inner surface of the elastic member at an axially middle location of the inner surface, at least one thin-walled section which is located radially outward from the recess and is made thin radially by the recess, and two or more thick-walled sections which remain thicker than the thin-walled section axially above and below the recess and the thin-walled section.

In the invention, by providing the annular recess in the elastic member, which is recessed radially outward from the inner surface of the elastic member at e.g. the middle of the inner surface in the axial direction, the elastic member is sectioned into a thin-walled section which is located radially outward from the recess, and two or more thick-walled sections which remain above and below, in the axial direction, the recess and the thin-walled section. Thereby, at the time of piercing the cloth when a load lower than that at the time of swaging the post is being imposed on the elastic member, the thin-walled section of the elastic member will be mainly deformed so as to absorb the load (the thick-walled sections would be partially deformed following the thin-walled section). Just after piercing the cloth, the elastic member is temporarily restored to release part of the load. After that, at the time of swaging the post, a load higher than that at piercing is being imposed on the elastic member. At this time, the thin-walled section of the elastic member will be first deformed more than the amount of deformation at the time of piercing the cloth, and then the thick-walled sections will begin to be deformed to absorb the load substantially after they have come in contact with or close to each other. Therefore, it is possible to make the flexibility of the elastic member different between at piercing and at swaging.

As a material of the elastic member, synthetic rubber such as butadiene rubber, nitrile rubber, chloroprene rubber, and natural rubber can be cited. Especially, e.g. polyurethane rubber is preferably used.

In the invention, the phrase "at an axially middle location" as stated above means at a location between the upper end and the lower end, in the axial direction, of the elastic member. In the case with only one recess in the elastic member, it is preferable to form the recess at the middle of the inner surface of the elastic member.

In an embodiment of the invention, at the time of the post piercing the cloth, the thin-walled section is mainly deformed, and at the time of swaging the post, the thin-walled section is first deformed more than the amount of deformation at the time of piercing the cloth and then the thick-walled sections are deformed. Thereby, it will be possible to deal with the cloth-piercing and the post-swaging with different flexibilities of the elastic member.

In an embodiment of the invention, at the time of the post piercing the cloth, at the time of swaging the post, the axial space of the recess in the elastic member reduces so as for the thick-walled sections axially adjacent to come close to each other. That is, with the load in the axial direction at swaging, the elastic member is deformed, and thereby the recess collapses such that the thick-walled sections above and below the recess approach or contact each other. After this approach of the thick-walled sections, the amount of deformation of the elastic member associated with increasing load will reduce.

In an embodiment of the invention, the elastic member has a first flexibility with which the thin-walled section is deformed at the time of the post piercing the cloth and a second flexibility with which the thick-walled sections are deformed at the time of swaging the post. That is, the elastic member exhibits the first flexibility at the cloth-piercing time with a relatively lower load at which the thick-walled section as more flexible is exclusively deformed, and the second flexibility (this is different from the first flexibility) at the swaging time with a load more than that in the cloth-piercing at which the thin-walled section is almost maximally deformed and then thick-walled sections as less flexible than the thin-walled section is deformed. Therefore, the elastic member would not be overly deformed at swaging unlike an elastic member in a conventional upper die. Further, desirable first and second flexibilities can be established by altering the configuration, the number, etc. of the recess in the elastic member.

In an embodiment of the invention, the thin-walled section can expand radially outward more than the thick-walled sections at the time of fastening the button to the cloth. That is, the thin-walled section can be elastically deformed to expand radially outward more than the thick-walled sections at the time of fastening the button to the cloth. The radially outward expansion of the thin-walled section will be greater at piercing than at swaging.

In an embodiment of the invention, the button-fastening upper die includes two or more recesses in the axial direction. For example, in the case with two recesses, one of the recesses can be provided at a location away from the upper end of the elastic member by ⅓ of the height of the elastic member in the axial direction, and the other recess can be provided at a location away from the lower end by ⅓ of the height, creating three, or upper, middle and lower thick-walled sections. Three or more recesses may be provided.

In an embodiment of the invention, the thin-walled section and the thick-walled sections are made of different materials, respectively. In this case, the deformability or flexibility of the elastic member as needed at the cloth-piercing time and the post-swaging time can be established more suitably in consideration of selection and combination of the materials of the thin- and thick-walled sections in addition to the configuration, the number, etc. of the recess.

In the button-fastening upper die according to the invention, by providing the elastic member with the recess so as to section the elastic member into the thin-walled section and the thick-walled sections, at the cloth-piercing time when a relatively lower load is being imposed on the elastic member, the thin-walled section will be deformed to absorb the load. At the post-swaging time when a higher load is being imposed on the elastic member, the thin-walled section is deformed greater than at piercing and then the thick-walled sections will be deformed absorbing the load.

DETAILED DESCRIPTION OF THE INVENTION

Figure 1:
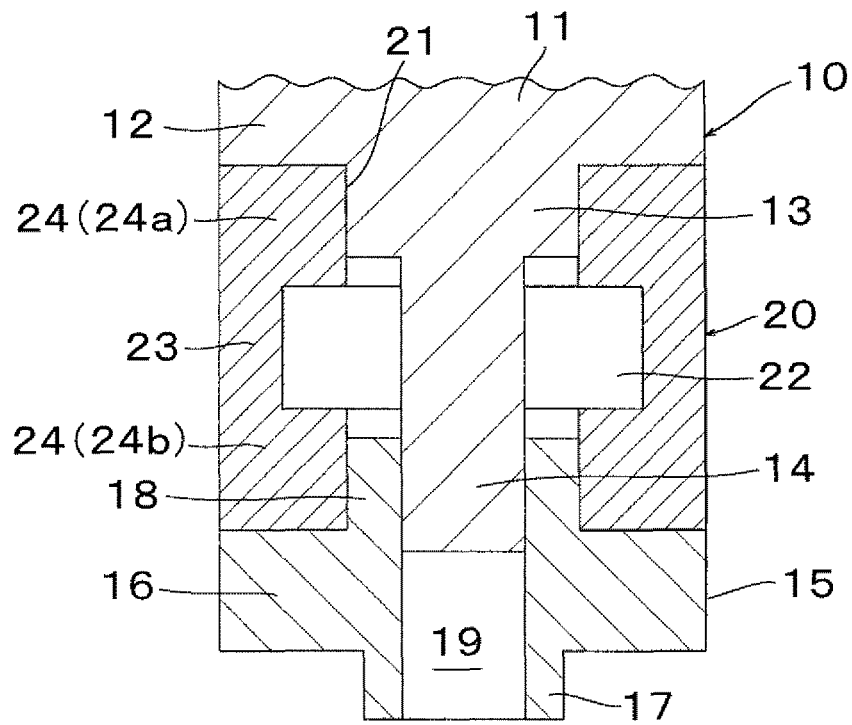
FIG. 1 is an illustrative sectional view showing an arrangement in the axial direction (up-and-down direction) of the members to fasten a button to a cloth including a button-fastening upper die in accordance with an embodiment of the present invention.
Figure 1:
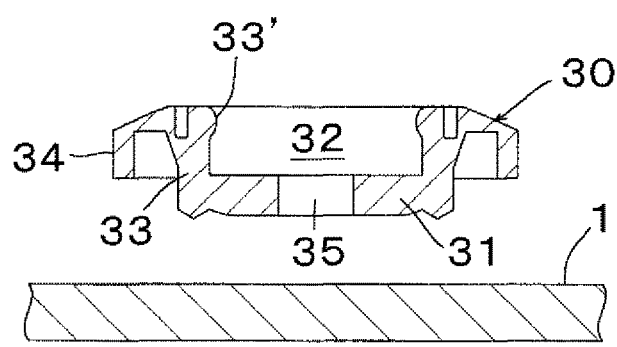
Figure 1:
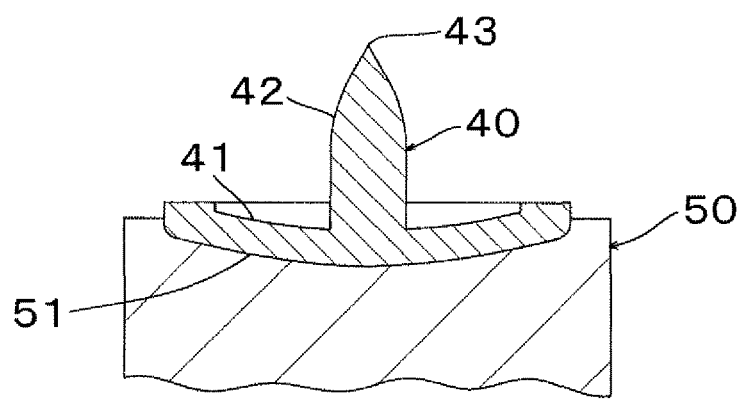

Hereinafter, preferred embodiments of the invention will be described with reference to the drawings. FIG. 1 shows an arrangement in the axial direction (up-and-down direction) of, from above, a button-fastening upper die (hereinafter referred to simply as "upper die") 10 in accordance with an embodiment of the present invention; a female snap button (hereinafter referred to simply as "button") 30 as one example of buttons; a fabric 1; a button fastener 40; and a lower die 50 when the button 30 is about to be fastened to the cloth 1. The upper die 10 comprises a die body 11 made of steel, an upper part unshown of which is connected to an up-and-down part of a button-fastening press machine (now shown); a button-holding member 15 made of metal to hold the button 30 at the time of fastening the button; and a cylindrical elastic member (spring) 20 made of urethane rubber disposed between the die body 11 and the button-holding member 15. The die body 11 includes a disk-shaped upper elastic member receiving part 12 to receive the upper surface of the elastic member 20, the diameter of the upper elastic member receiving part 12 being the same as the outer diameter of the elastic member 20; an upper elastic member supporting part 13 extending downward from the upper elastic member receiving part 12 concentrically therewith to support the elastic member 20, the diameter of the upper elastic member supporting part 13 being the same as the inner diameter of the elastic member 20; and a columnar punch 14 extending downward from the upper elastic member supporting part 13 concentrically therewith, the diameter of the punch 14 being smaller than the inner diameter of the elastic member 20. Although not shown in the drawings, on the bottom of the punch 14, a depression may be formed to receive the tip 43 of a post 42 of the button fastener 40 immediately before the post 42 is swaged. The button-holding member 15 includes a lower elastic member receiving part 16 to receive the lower surface of the elastic member 20, the diameter of the lower elastic member receiving part 16 being the same as the outer diameter of the elastic member 20; a cylindrical button-holding part 17 extending downward from the lower elastic member receiving part 16 concentrically therewith to hold the button 30 by engaging with a projection-receiving space 32 of the button; a lower elastic member supporting part 18 extending upward from the lower elastic member receiving part 16 concentrically therewith to support the elastic member 20, the diameter of the lower elastic member supporting part 18 being the same as the inner diameter of the elastic member 20; and a columnar center bore 19 passing through the lower and upper elastic member supporting parts 18, 16 and the button-holding part 17 concentrically in the up-and-down direction for passing the punch 14 of the die body 11 through the bore. The outer diameter of the button-holding part 17 is the same as the diameter of the projection-receiving space 32 of the button 30 as described below.

Figure 2:
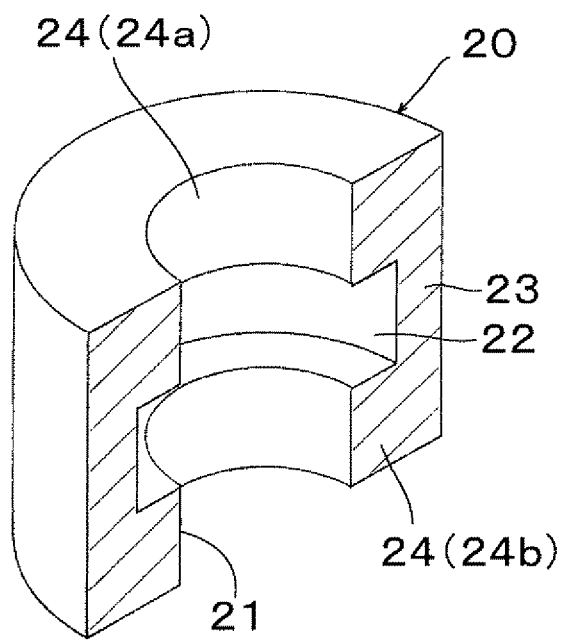
FIG. 2 is a longitudinally cutaway perspective view of an elastic member of the button-fastening upper die.

As also shown in FIG. 2, in a middle area in the up-and-down direction on the inner surface 21 of the elastic member 20, an annular recess 22 is formed as recessed radially outward from the inner surface 21. The elastic member 20 is sectioned into a thin-walled section 23 radially outward from the recess 22, the thin-walled section 23 being made thin in the radial direction by the recess 22; and two thick-walled sections 24, namely, an upper thick-walled section 24*a* and a lower thick-walled section 24*b*, which remain thick above and below the recess 22 and the thin-walled section 23. The recess 22 has a longitudinal rectangular cross-section, and the length in the-up and-down direction of the recess 22 is approximately ⅓ of that of the elastic member 20. The depth of the recess 22 from the inner surface 21 in the radial direction is approximately ½ of the length, in the radial direction, of the thick-walled sections 24. The length, in the radial direction, of the thin-walled section 23 is also approximately ½ of that of the thick-walled sections 24.

The female snap button 30 is a resin molded product, and comprises a disk-like base 31, a periphery side 33 rising cylindrically from a radially outward end of the base 31 to define, above the base 31, a projection-receiving space 32 which can detachably receive a projection of a male snap button as not shown, and a flange skirt 34 extending radially outward from an upper end of the periphery side 33. In a center area of the base 31, there is provided a fastening opening (hereinafter referred to simply as "opening") 35. At an upper end of the periphery side 33, there is provided a bulge 33' bulging radially inward. The bulge 33' can be elastically radially displaced by contacting a projection of a male snap button (not shown) when the projection is engaging with and disengaging from the projection-receiving space 32. When the button 30 is brought to be held by the button-holding part 17 of the button-holding member 15 of the upper die 10, the bulge 33' is elastically displaced radially outward by attaching the button 30 with the projection-receiving part 32 in the lead to the button-holding part 17, so that the button 30 can be held by the button-holding member 15 by a restoring force of the elastic displacement. The button fastener 40 is made of resin or metal, and comprises an almost disk-like base 41, and a post 42 protruding upward from the base 41 concentrically therewith and tapering with the tip 43 as being pointed. The lower die 50 has a concave fastener-setting part 51 on the upper surface to fittingly receive the base 41 of the button fastener 40. The post 42 of the button fastener 40 as set in the fastener-setting part 51 is concentric with the upper die 10.

Figure 3:
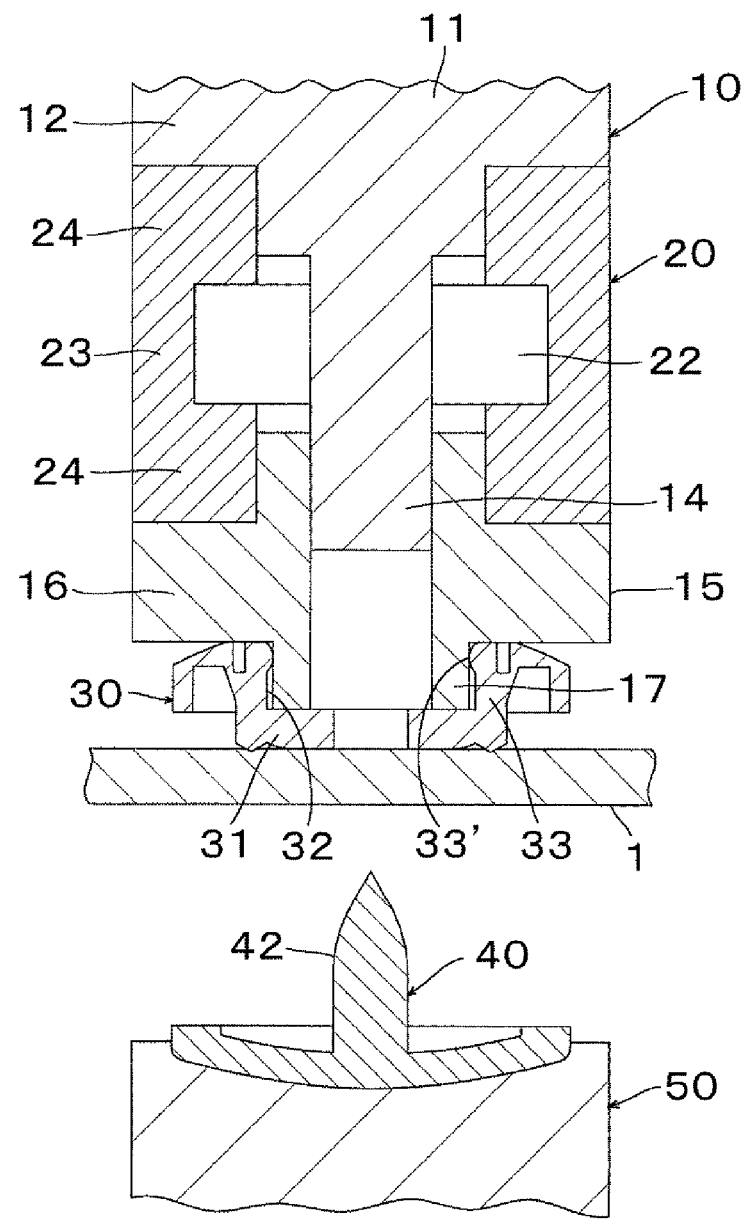
FIG. 3 is an illustrative sectional view showing an initial stage of a button-fastening process.
Figure 4:
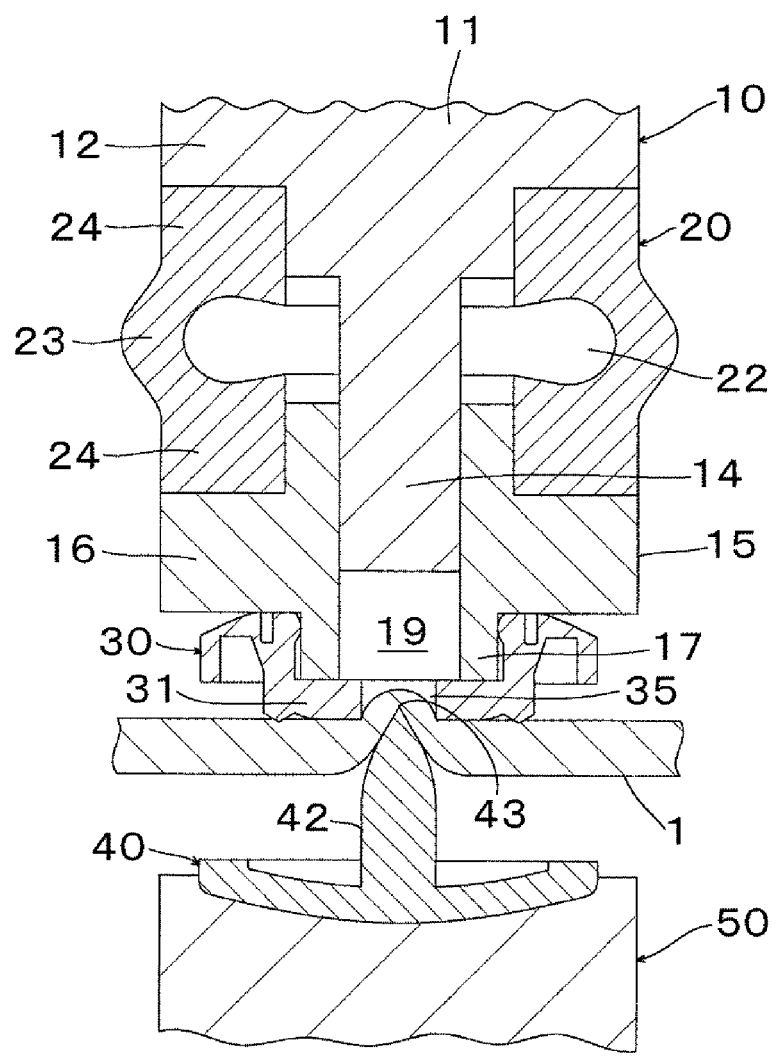
FIG. 4 is an illustrative sectional view in a button-fastening process where a post of a button fastener is in a state immediately before piercing the cloth.

Next, a process to fasten the button 30 to the cloth 1 using the upper die 10 will be described. FIG. 3 shows a state where the upper die 10 begins to move down by operating the button-fastening press machine (now shown), after the button 30 is held by the button-holding part 17 of the button-holding member 15 of the upper die 10. From this state, with the upper die 10 moving down further, the cloth 1 is held between the base 31 of the button 30 and the post 42 of the button fastener 40 as shown in FIG. 4, where the post 42 is in a state immediately before piercing the cloth 1 as pushing up the cloth 1 into the opening 35 of the button 30. In this state, the elastic member 20 receives a load (hereinafter referred to as "cloth-piercing load") in the axial direction both from the upper elastic member receiving part 12 of the die body 11 which is going down and from the lower elastic member receiving part 16 of the button-holding member 15, which, along with the cloth 1 and the button 30, is hampered from being displaced downward by the post 42 as becoming a resistance. With the cloth-piercing load, the elastic member 20 is elastically deformed so as for exclusively the thin-walled section 23 to somewhat expand radially outward to absorb the load. At this time, the up-and-down space of the recess becomes somewhat narrower.

Figure 5:
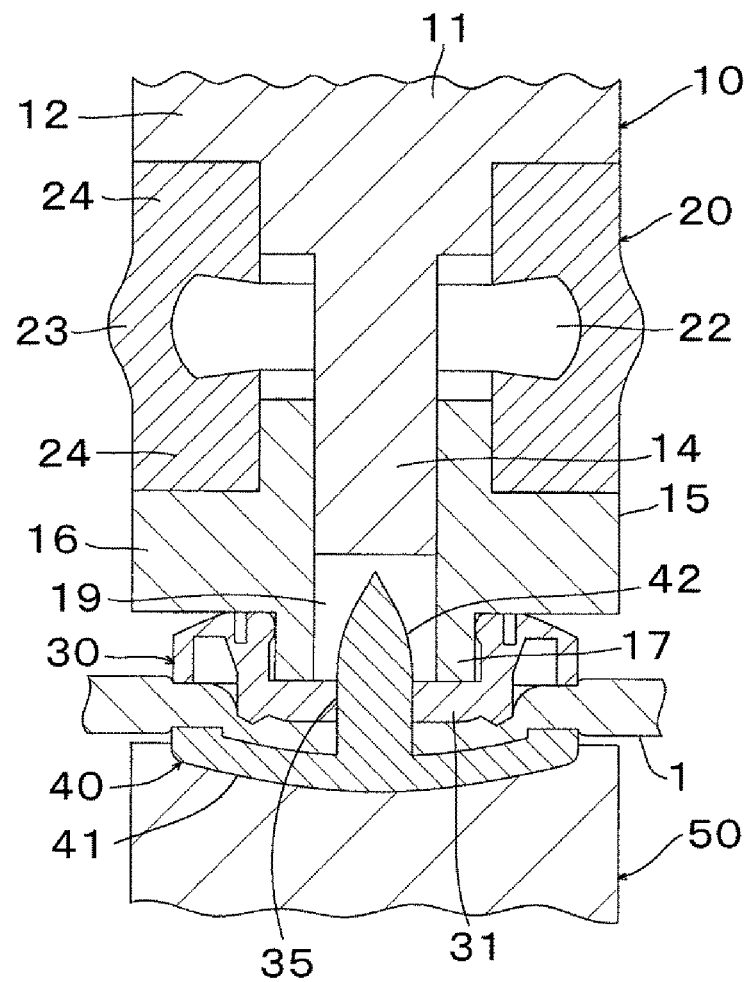
FIG. 5 is an illustrative sectional view in a button-fastening process where the post has just pierced the cloth.

Immediately after the post 42 of the button fastener 40 has pierced the cloth 1 from the FIG. 4 state, the load imposed on the elastic member 20 is relieved temporarily and, in the elastic member 20 as shown in FIG. 5, an amount of deformation of the thin-walled section 23 decreases by being slightly restored from the FIG. 4 state. At this time, the button-holding member 15 is displaced downward, and the cloth 1 reaches the base 41 of the button fastener 40 and then begins to be compressed between the base 41 and the base 31 of the button 30. The post 41, which has pierced the cloth 1, goes into the center bore 19 of the button-holding member 15 through the opening 35 of the button 30. At this time, the punch 14 of the punch body 11 has not yet reached the tip 43 of the post 42. From this state, with the punch body 11 moving down, a step of swaging the post 42 begins.

Figure 6:
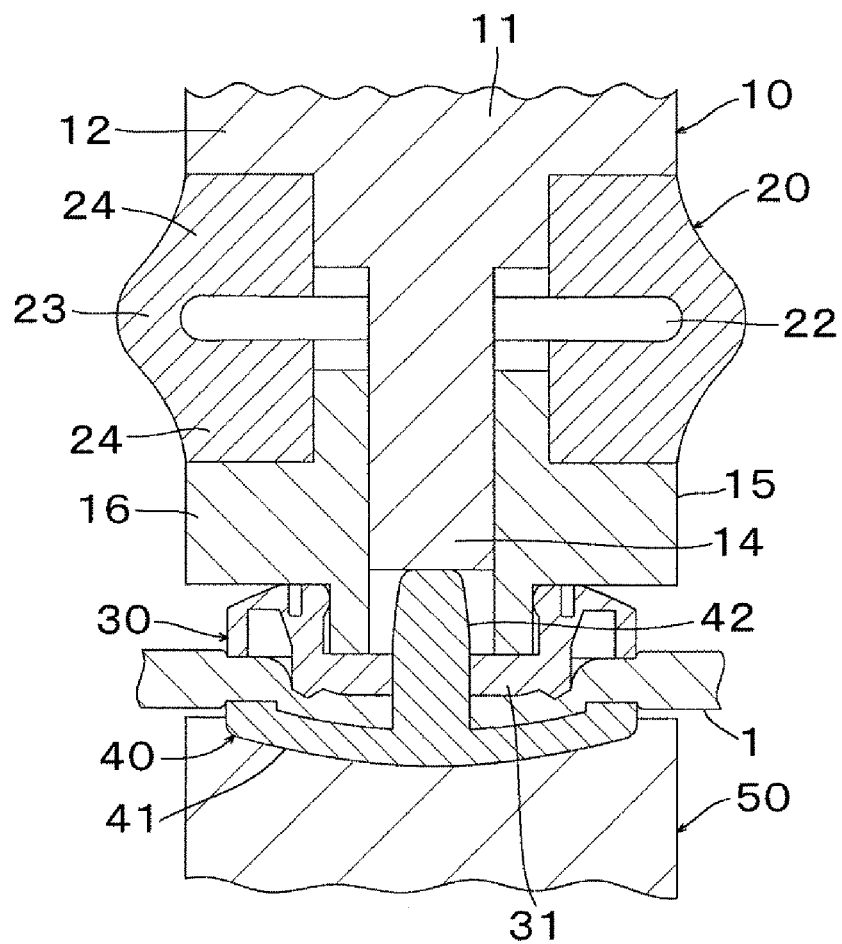
FIG. 6 is an illustrative sectional view in a button-fastening process showing an initial stage of swaging the post.
Figure 7:
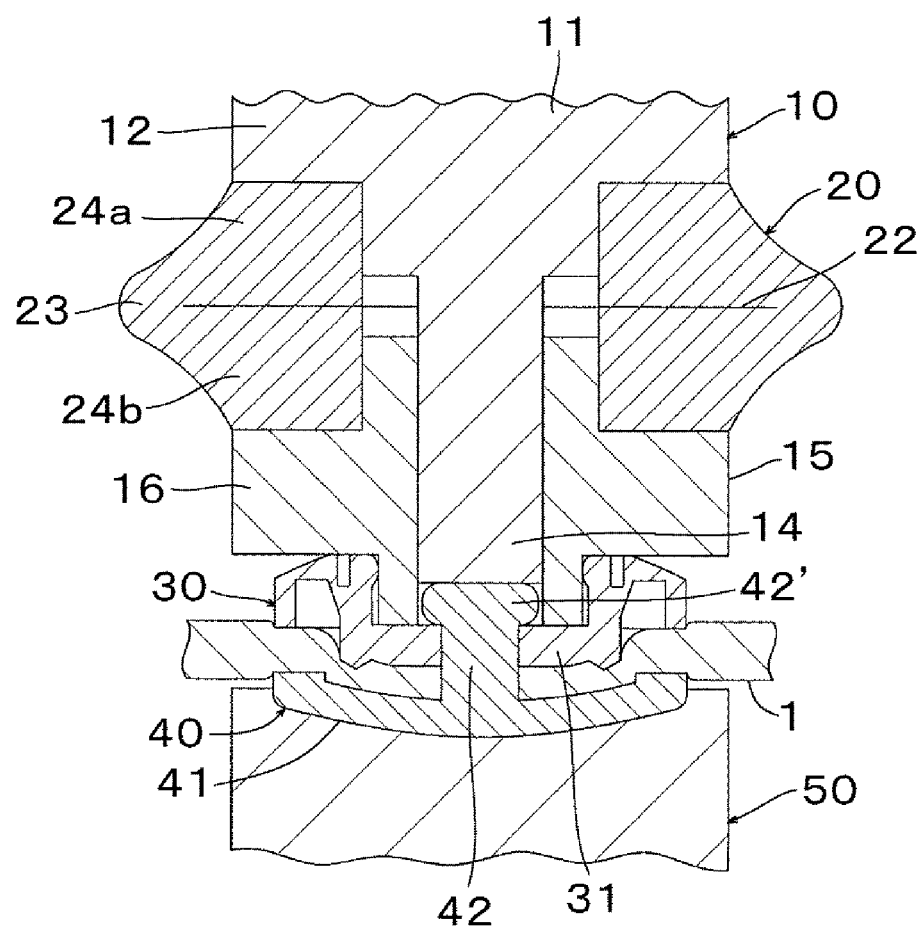
FIG. 7 is an illustrative sectional view in a button-fastening process showing a middle stage of swaging the post.
Figure 8:
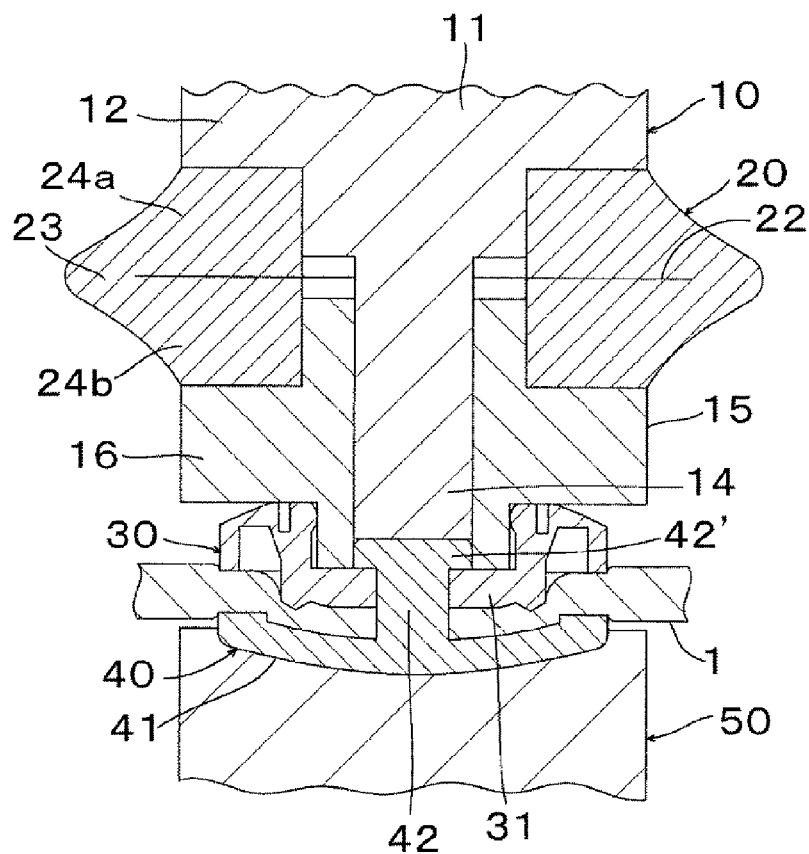
FIG. 8 is an illustrative sectional view in a button-fastening process showing a final stage of swaging the post.

FIG. 6 shows an early stage in the swaging step, where the punch 14 of the punch body 11 is beginning to swage the post 42 of the button fastener 40, after the punch 14 has reached the tip 43 of the post 42 while passing along the center bore 19 of the button-holding member 15. In this state, the elastic body 20 is beginning to receive a axial load which will exceed the cloth-piercing load both from the upper elastic member receiving part 12 of the die body 11 which is going down while swaging the post 42 with the punch 14 and from the lower elastic member receiving part 16 of the button-holding member 15, which is inhibited from being displaced downward while pressing down the button 30 against the cloth 1 as supported from below by the base 41 of the button fastener 40 and the lower die 50. The load increases gradually from the beginning of the swaging step to the end. At the early stage of the swaging step in FIG. 6, the elastic body 20 contracts in the axial direction by the load with the up-and-down space of the recess 22 becoming narrower, and the thin-walled section 23 expands radially outward more than at the cloth-piercing time. From this state, with the punch 14 of the die body 11 moving down further, the post 42' as being compressed is beginning to expand radially outward as shown in FIG. 7. At this time, the elastic body 20 further contracts in the axial direction by receiving the load as being increased with the recess 22 crushing to become extinct or almost extinct, and the upper thick-walled section 24*a* and the lower thick-walled section 24*b* come in contact with or close to each other, making the amount of deformation of the thin-walled section 23 maximum. From this state, with the punch 14 being slightly displaced downward to further crush the post 42', the swaging step ends as shown in FIG. 8, and the fastening of the button 30 to the cloth 1 is completed. In this final stage in the swaging step, the elastic body 20 somewhat contracts in the up-and-down direction by receiving the maximal load (hereinafter referred to as "swaging load"). At this time, while the thin-walled section 23, which has been already distorted maximally, can not be substantially deformed, the upper and lower thick-walled sections 24*a*, 24*b*, which have been adjacent or close to each other in the up-and down direction, can be deformed to absorb the swaging load. The flexibility (second flexibility) of the elastic body 20 when exclusively the thick-walled sections 24 becomes deformed after the thin-walled section 23 has been deformed almost maximally is less than the flexibility (first flexibility) of the elastic body 20 when exclusively the thin-walled section 23 becomes deformed at the cloth-piercing time. Therefore, at the swaging time, the elastic body 20 can be deformed by receiving a load as required successfully to hold down the button 30 and the cloth 1 by the button-holding member 15 and to swage the post 42 by the punch 14 of the die body 11, but the elastic body 20 cannot be deformed more than necessary and does not accept an excess load. Thereby, the load which will be imposed on the button 30, the upper die 10, the button-fastening press machine, etc. will reduce.

Figure 9:
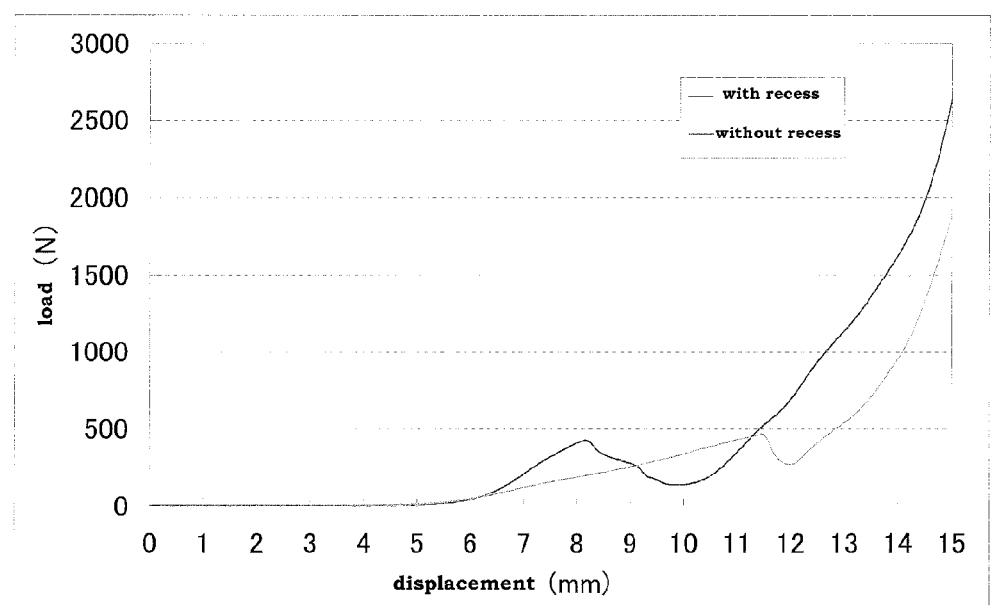
FIG. 9 is a graph showing measurements of the displacement of a punch and the load as being imposed on elastic members with and without a recess in a button-fastening process.
Figure 10:
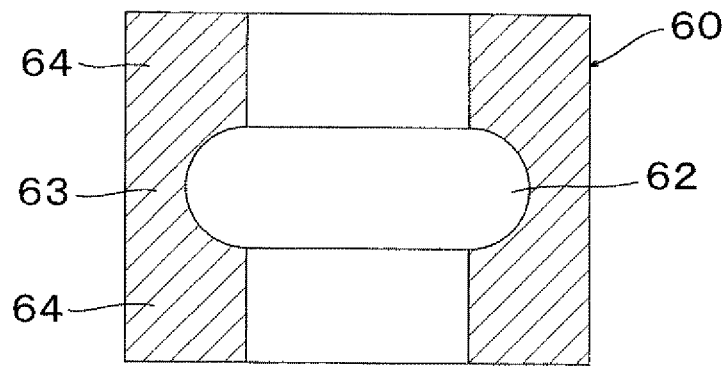
FIG. 10 is an illustrative longitudinal sectional view showing another example of an elastic member.
Figure 11:
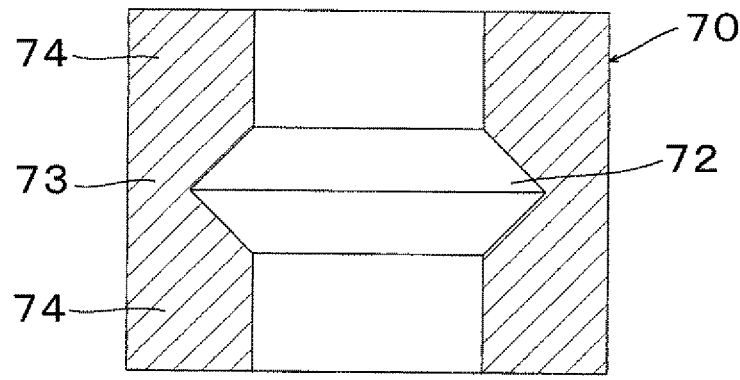
FIG. 11 is an illustrative longitudinal sectional view showing another example of an elastic member.
Figure 12:
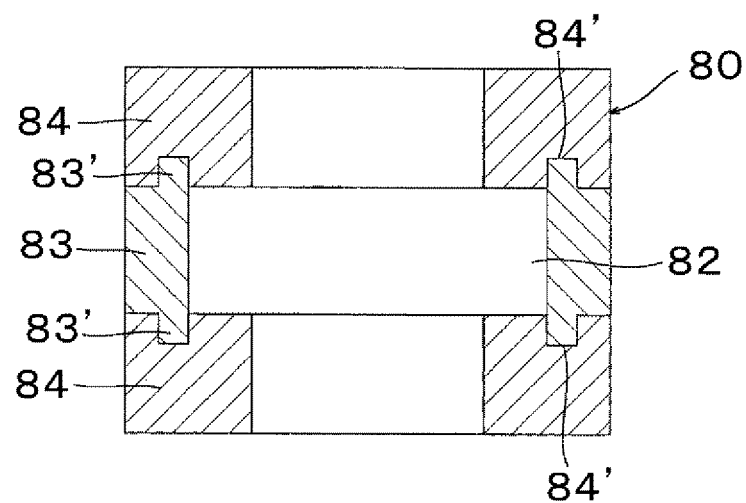
FIG. 12 is an illustrative longitudinal sectional view showing still another example of an elastic member.
Figure 13:
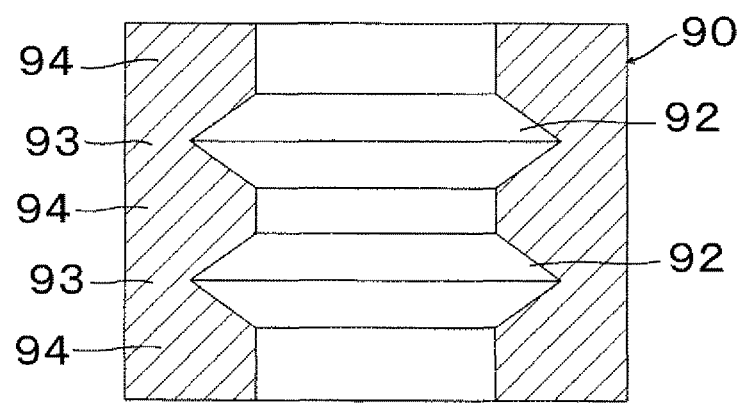
FIG. 13 is an illustrative longitudinal sectional view showing still another example of an elastic member.

FIG. 9 is a graph, with regard to the elastic member 20 with the recess 22 and a cylindrical elastic member (conventional elastic member) which has not the recess 22 and is the same size as the elastic member 20 except the absence of the recess 22, showing measurements of the amount of displacement (descent) of the punch 14 as moving down at the time of fastening the button 30 to the cloth 1 and the axial load as being imposed on each elastic member. Before the post 42 of the button fastener 40 has pierced the cloth 1, a load is being imposed on each of the elastic members from the upper elastic member receiving part 12 of the die body 11 and the lower elastic member receiving part 16 of the button-holding member 1, exercising a compressing act on each elastic member. Though this load gradually increases as the amount of displacement of the punch 14 increases, the load on each elastic member will reduce at the instant of the post 42 having just pierced the cloth 1 since each elastic member is temporarily relieved from the compressing action. Though a cloth-piercing load as needed for the post 42 to pierce the cloth 1 varies with the materials, thicknesses, etc. of the cloth 1, in the examples of the FIG. 9 graph, both of the cloth-piercing operations are done with loads between 400 N to less than 500 N. After that, the load being imposed on each elastic member will turn to increase again since the punch 14 begins to swage the post 42. Though a swaging load as needed to swage the post 42 varies with the material of the button fastener 40, the amount of swaging the post 42, etc., in the examples of the FIG. 9 graph, the post 42 is swaged with loads more than or equal to 500 N, which are greater than their respective cloth-piercing loads. Comparing the loads as being imposed on the elastic members at the time of the punch 14 swaging the post 42 between the elastic member 20 with the recess 22 and the elastic member without the recess, the load in the former is less than the load in the latter by more than or equal to 500 N. It can be understood that, in the former, an excess of load will not be permitted.

FIGS. 10 to 13 show different examples of the elastic member. The elastic member 60 in FIG. 10 has a recess 62 with a longitudinal hemispherical cross-section, and is sectioned into a thin-walled section 63 and upper and lower thick-walled sections 64 by the recess 62. The elastic member 70 in FIG. 11 has a recess 72 with a longitudinal triangular cross-section, and is sectioned into a thin-walled section 73 and upper and lower thick-walled sections 74 by the recess 72. The elastic member 80 in FIG. 12 includes a thin-walled section 83 and thick-walled sections 84, which are separately formed of different materials beforehand and then are assembled. At the radially inward ends on the upper and lower surfaces of the thin-walled section 83, there are provided annular bulges 83', while at almost middle of the lower surface of the upper thick-walled section 84 and at almost middle of the upper surface of the lower thick-walled section 84, there are provided annular grooves 84', respectively, to engage with the bulges 83' of the thin-walled section 83. In this case, the first and the second flexibilities of the elastic member 80 can be established based on the materials of the thin- and thick-walled sections 83, 84 in addition to the configuration of the recess 82 and the number of recesses to be provided. The elastic member 90 in FIG. 13 includes two recesses 92 in the up-and-down direction, and accordingly it has two, or upper and lower thin-walled sections 93 and three, or upper, middle and lower thick-walled sections 94. The recesses 92 are formed at the locations to divide the up-and-down length of the elastic member 90 equally among three.

DESCRIPTION OF REFERENCE NUMBERS

1 cloth
10 button-fastening upper die
11 die body
12 upper elastic member receiving part
14 punch
15 button-holding member
16 lower elastic member receiving part 16
17 button-holding part
19 center bore
20, 60, 70, 80, 90 elastic member
21 inner surface
22, 62, 72, 82, 92 recess
23, 63, 73, 83, 93 thin-walled section
24, 64, 74, 84, 94 thick-walled section
24*a* upper thick-walled section
24*b* lower thick-walled section
30 button (male snap button)
31 base
32 projection-receiving space
35 fastening opening
40 button fastener
42 post
50 lower die

The invention claimed is:

1. A button-fastening upper die for swaging a post of a button fastener, at the time of fastening a button having a fastening opening to a cloth using the button fastener, after the post has passed through the cloth and then the fastening opening, the button-fastening upper die comprising:
   a cylindrical elastic member;
   a die body including an upper elastic member receiving part to receive an axially upper surface of the elastic member, and a columnar punch to swage the post of the button fastener; and a button-holding member by which the button is held at the time of fastening the button to the cloth, the button-holding member including a lower elastic member receiving part to receive an axially lower surface of the elastic member and a center bore through which the punch passes;

wherein the elastic member includes at least one annular recess which is recessed radially outward from the inner surface of the elastic member at an axially middle location of the inner surface, at least one thin-walled section which is located radially outward from the recess and is made thin radially by the recess, and two or more thick-walled sections which remain thicker than the thin-walled section axially above and below the recess and the thin-walled section.

2. The button-fastening upper die according to claim 1, wherein the elastic member has a first elasticity with which the thin-walled section is deformed at the time of the post piercing the cloth and a second elasticity with which the thick-walled sections are deformed at the time of swaging the post, the second elasticity being different from the first elasticity.

3. The button-fastening upper die according to claim 1, including two or more recesses in the axial direction.

4. The button-fastening upper die according to claim 1, wherein the thin-walled section and the thick-walled sections are made of different materials, respectively.

* * * * *